US009658946B2

(12) United States Patent
Bhuiya

(10) Patent No.: US 9,658,946 B2
(45) Date of Patent: *May 23, 2017

(54) TEST MACHINE MANAGEMENT

(71) Applicant: International Business Machines Corporation, Armonk, NY (US)

(72) Inventor: Subhajit Bhuiya, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/248,055

(22) Filed: Aug. 26, 2016

(65) Prior Publication Data
US 2017/0052883 A1 Feb. 23, 2017

Related U.S. Application Data

(63) Continuation of application No. 15/219,610, filed on Jul. 26, 2016, which is a continuation of application
(Continued)

(51) Int. Cl.
G06F 9/44 (2006.01)
G06F 11/36 (2006.01)
(Continued)

(52) U.S. Cl.
CPC ...... *G06F 11/3684* (2013.01); *G06F 11/3664* (2013.01); *G06F 11/3688* (2013.01);
(Continued)

(58) Field of Classification Search
CPC ............... G06F 11/2205; G06F 11/263; G06F 11/3684; G06F 11/3688; G06F 11/3692
(Continued)

(56) References Cited

U.S. PATENT DOCUMENTS 5,371,883 A 12/1994 Gross et al.
6,031,990 A * 2/2000 Sivakumar .......... G06F 11/3664
714/E11.208
(Continued)

OTHER PUBLICATIONS

Appendix P List of IBM Patents or Patent Applications Treated as Related, Dated Aug. 26, 2016. Two pages.
(Continued)

*Primary Examiner* — Qing Chen
*Assistant Examiner* — Mohammed Huda
(74) *Attorney, Agent, or Firm* — William H. Hartwell

(57) ABSTRACT

A method includes distributing the plurality of test cases to any available test agents, wherein each test case out of the plurality of test cases does not have any associated preconditions. The method receives event information for a first test case out of the plurality of test cases from a first test agent. Responsive to determining the event information for the first test case includes a satisfied condition for a second test case, the method determines whether the satisfied condition for the second test case relates to a global variable or local variable. The method handles the second test case, wherein handling the second test case includes distributing the second test case to the first test agent subsequent to the first test agent becoming available if the satisfied condition relates to the local variable.

20 Claims, 3 Drawing Sheets

Related U.S. Application Data

No. 15/009,908, filed on Jan. 29, 2016, now Pat. No. 9,471,478, which is a continuation of application No. 14/830,921, filed on Aug. 20, 2015, now Pat. No. 9,501,389.

(51) Int. Cl.
*G06F 11/22* (2006.01)
*G06F 11/263* (2006.01)

(52) U.S. Cl.
CPC ........ *G06F 11/2205* (2013.01); *G06F 11/263* (2013.01); *G06F 11/3692* (2013.01)

(58) Field of Classification Search
USPC .................................................. 717/124, 126
See application file for complete search history.

(56) References Cited

U.S. PATENT DOCUMENTS

| | | | |
|---|---|---|---|
| 6,542,841 B1 | 4/2003 | Snyder | |
| 6,698,012 B1* | 2/2004 | Kossatchev | G06F 11/3684 |
| | | | 714/E11.208 |
| 7,392,149 B2 | 6/2008 | Bonilla | |
| 7,849,362 B2 | 12/2010 | Devins et al. | |
| 8,522,083 B1* | 8/2013 | Cohen | G06F 11/3672 |
| | | | 714/38.1 |
| 8,561,036 B1* | 10/2013 | Beans | G06F 11/368 |
| | | | 717/124 |
| 8,839,202 B2* | 9/2014 | Tempel | G06F 9/45558 |
| | | | 717/124 |
| 9,015,668 B1* | 4/2015 | Michelsen | G06F 8/70 |
| | | | 717/120 |
| 2001/0012986 A1* | 8/2001 | Conan | G06F 11/3688 |
| | | | 702/188 |
| 2002/0083213 A1 | 6/2002 | Oberstein et al. | |
| 2003/0212924 A1 | 11/2003 | Avvari et al. | |
| 2004/0015845 A1* | 1/2004 | Hickman | G06F 9/45504 |
| | | | 717/114 |
| 2004/0015846 A1 | 1/2004 | Haisraeli | |
| 2005/0096864 A1 | 5/2005 | Bonilla | |
| 2005/0188262 A1 | 8/2005 | Rosenman et al. | |
| 2006/0265172 A1 | 11/2006 | Basham et al. | |
| 2006/0265691 A1* | 11/2006 | Klinger | G06F 11/3684 |
| | | | 717/124 |
| 2010/0192128 A1 | 7/2010 | Schloegel et al. | |
| 2011/0208469 A1 | 8/2011 | Sheye | |
| 2012/0030654 A1 | 2/2012 | Park et al. | |
| 2013/0106878 A1 | 5/2013 | Williams | |
| 2013/0117611 A1 | 5/2013 | Chakraborty et al. | |
| 2013/0152047 A1* | 6/2013 | Moorthi | G06F 11/368 |
| | | | 717/124 |
| 2013/0174178 A1* | 7/2013 | Chakraborty | G06F 11/3672 |
| | | | 718/105 |
| 2014/0047278 A1 | 2/2014 | Sheye | |
| 2014/0109063 A1* | 4/2014 | Schissel | G06F 11/368 |
| | | | 717/127 |
| 2016/0314056 A1* | 10/2016 | Greene | G06F 11/3612 |

OTHER PUBLICATIONS

U.S. Appl. No. 14/830,921, filed Aug. 20, 2015 as IBM Docket No. IN920150111US1.
U.S. Appl. No. 15/009,908, filed Jan. 29, 2016 as IBM Docket No. IN920150111US2.
U.S. Appl. No. 15/219,610, filed Jul. 26, 2016 as IBM Docket No. IN920150111US3.

* cited by examiner

TEST MACHINE MANAGEMENT

BACKGROUND

The present invention relates generally to automated testing and more particularly to executing test cases while resolving dependency.

Typically, in automated testing, automated test cases execute in batches or in the form of a test suite. Automated test cases are generally executed on different test machines available to a test manager program. The test machine, on which a particular test case executes is either determined by a user or the test manager program, where the test manager program locates the test machine on which to run the particular test case based on availability and load. For test cases assigned to batches or a test suite, a single test case can depend on one or more test cases. For example, a first test case may depend on the execution of a second and a third test case. The test cases typically execute in such an order so that the first test case executes subsequent to the execution of the second and the third test cases, on which the first test case depends. As a result, the first test case may remain idle, even though there may be available test machines to execute the first test case.

SUMMARY

Embodiments of the present invention disclose a method, computer program product and computer system for test case management. A method includes responsive to reaching a specified execution time for a plurality of test cases, distributing, by one or more processors, the plurality of test cases to any available test agents, wherein each test case out of the plurality of test cases does not have any associated preconditions; receiving, by one or more processors, event information for a first test case out of the plurality of test cases from a first test agent; responsive to determining the event information for the first test case includes a satisfied condition for a second test case, determining, by one or more processors, whether the satisfied condition for the second test case relates to a global variable or local variable; handling, by one or more processors, the second test case, wherein handling the second test case includes distributing the second test case to the first test agent subsequent to the first test agent becoming available if the satisfied condition relates to the local variable and the satisfied condition indicates that the local variable is below, equal, or above a predetermined value, wherein handling the second test case includes distributing the second test case to any idle test agent from the plurality of test agents if the satisfied condition relates to the global variable, and wherein handling the second test case includes queuing the second test case if there are no idle test agents; responsive to determining that a second test agent has become available, determining, by one or more processors, whether any of the test cases in the queue include satisfied local variables for the second test agent; and executing, by one or more processors, a third test case with a satisfied local variable for the second test agent.

DETAILED DESCRIPTION

Embodiments of the present invention provide a method for defining a dependency chain for test cases for execution on various test agents. Defining dependency includes establishing preconditions for a test case that depends on another test case executing first or depends on another test case producing a particular result prior to execution. Once the dependency chain is established, embodiments of the present invention execute test cases without preconditions first on any available test agents, since the test cases without preconditions do not depend on other test cases. Embodiments of the present invention receive test results and event information from each of the test agents executing the test cases with no preconditions and identifies any variance in the local or global variables, where the local or global variables act as precondition triggers for executing a particular test case.

Embodiments of the present invention determine whether the event information includes a satisfied condition for another test case and determine whether that satisfied condition is on a local or global variable. If the satisfied condition is on a local variable, embodiments of the present invention execute the other test case on the same test agent from which the event information was received. If the satisfied condition is on a local variable, embodiments of the present invention execute the other test case on any available test agent.

Figure 1:
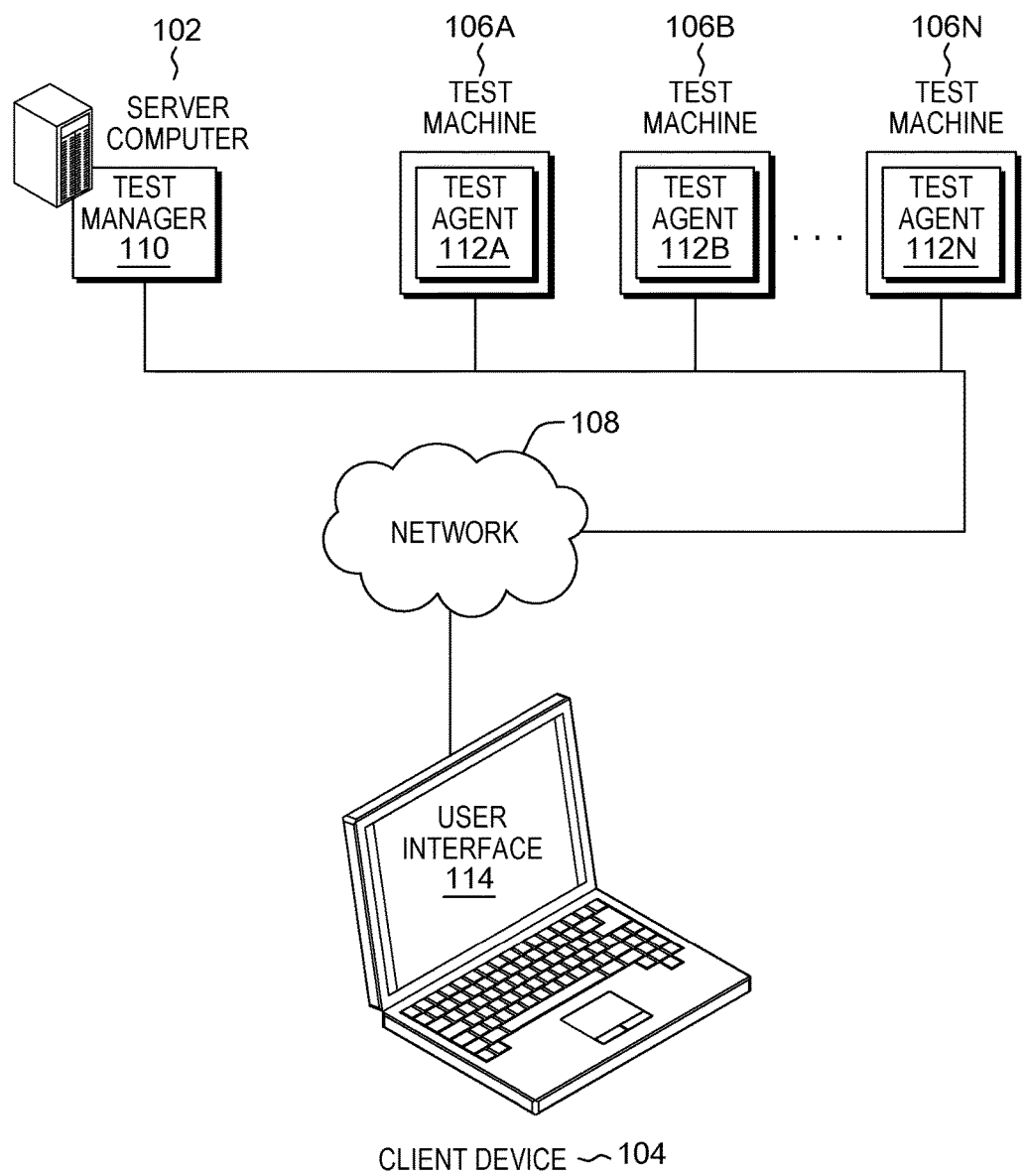
FIG. 1 is a functional block diagram illustrating a distributed data processing environment, in an embodiment in accordance with the present invention.

Example embodiments in accordance with the present invention will now be described in detail with reference to the drawing figures. FIG. 1 is a functional block diagram illustrating a distributed data processing environment. The distributed data processing environment includes server computer 102, client device 104, and test machine 106A-106N interconnected over network 108.

Server computer 102 may be a desktop computer, a laptop computer, a tablet computer, a specialized computer server, a smartphone, or any other computer system known in the art. In certain embodiments, server computer 102 represents a computer system utilizing clustered computers and components that act as a single pool of seamless resources when accessed through network 108, as is common in data centers and with cloud computing applications. In general, server computer 102 is representative of any programmable electronic device or combination of programmable electronic devices capable of executing machine readable program instructions and communicating with other computer devices via a network. In this embodiment, server computer 102 has the ability to communicate with other computer devices to query the computer devices for information.

Test machine 106A-106N represents a plurality of test machines capable of executing test cases distributed by test manager 110. Test machine 106A-106N may be laptop computers, tablet computers, netbook computers, personal computers (PC), desktop computers, personal digital assistants (PDA), smart phones, wearable devices (e.g., digital eyeglasses, smart glasses smart watches, personal fitness devices, personal safety devices), or any programmable computer system known in the art. Each test machine 106A-106N includes test agent 112A-112N, respectively. Test agent 112A-112N runs test machine 106A-106N, respectively, and send results to test manager 110 after executing each step of a test case or test script.

Test manager 110 residing in server computer 102 has the ability to manage the dependency chain among test cases and execute the test cases on test machine 106A-106N while resolving the dependency chain among the test cases. Test manager 110 creates a test suite with multiple test cases, where a portion of the test cases include preconditions and another portion of the test cases do not include preconditions. Test manager 110 distributes the portion of test cases with preconditions to any available test agent 112A-112N. Test manager 110 receives test results and event information for the test cases with preconditions and determines if the event information includes a satisfied condition for another test case with preconditions. Test manager 110 determines, based on whether the satisfied condition is a global variable or a local variable, which test agent 112A-112N to execute the test case with the precondition on.

Client device 104 may be a desktop computer, a laptop computer, a tablet computer, a specialized computer server, a smart phone, or any programmable electronic device capable of communicating with server computer 102 and test machine 106A-106N via network 108. In general, client device 104 represents any programmable electronic device or combination of programmable electronic devices capable of executing machine readable program instructions and communicating with other computing devices via a network, such as network 108. Client device 104 includes user interface 114 through which a user of client device 104 can communicate with test manager 110 residing on server computer 102.

User interface 114 may be a graphical user interface (GUI) or a web user interface (WUI) or a command line interface and can display text, documents, web browser windows, user options, application interfaces, and instructions for operation, and includes the information (such as graphic, text, and sound) a program presents to a user and the control sequences the user employs to control the program. User interface 114 may also be mobile application software that provides an interface between a user of client device 104 and importation optimizer. Mobile application software, or an "app", is a computer program designed to run on smart phones, tablet computers and other mobile devices. User interface 114 enables a user of client device 104 to create a test suite and view results, along with event information for each test case being executed by test agent 112A-112N on test machine 106A-106N, respectively.

In general, network 108 can be any combination of connections and protocols that will support communications among server computer 102 and test machine 106A-106N. Network 108 can include, for example, a local area network (LAN), a wide area network (WAN), such as the internet, a cellular network, or any combination of the preceding, and can further include wired, wireless, and/or fiber optic connections. In one embodiment, Test manager 110 can be a web service accessible via network 108 to a user of server computer 104.

Figure 2:
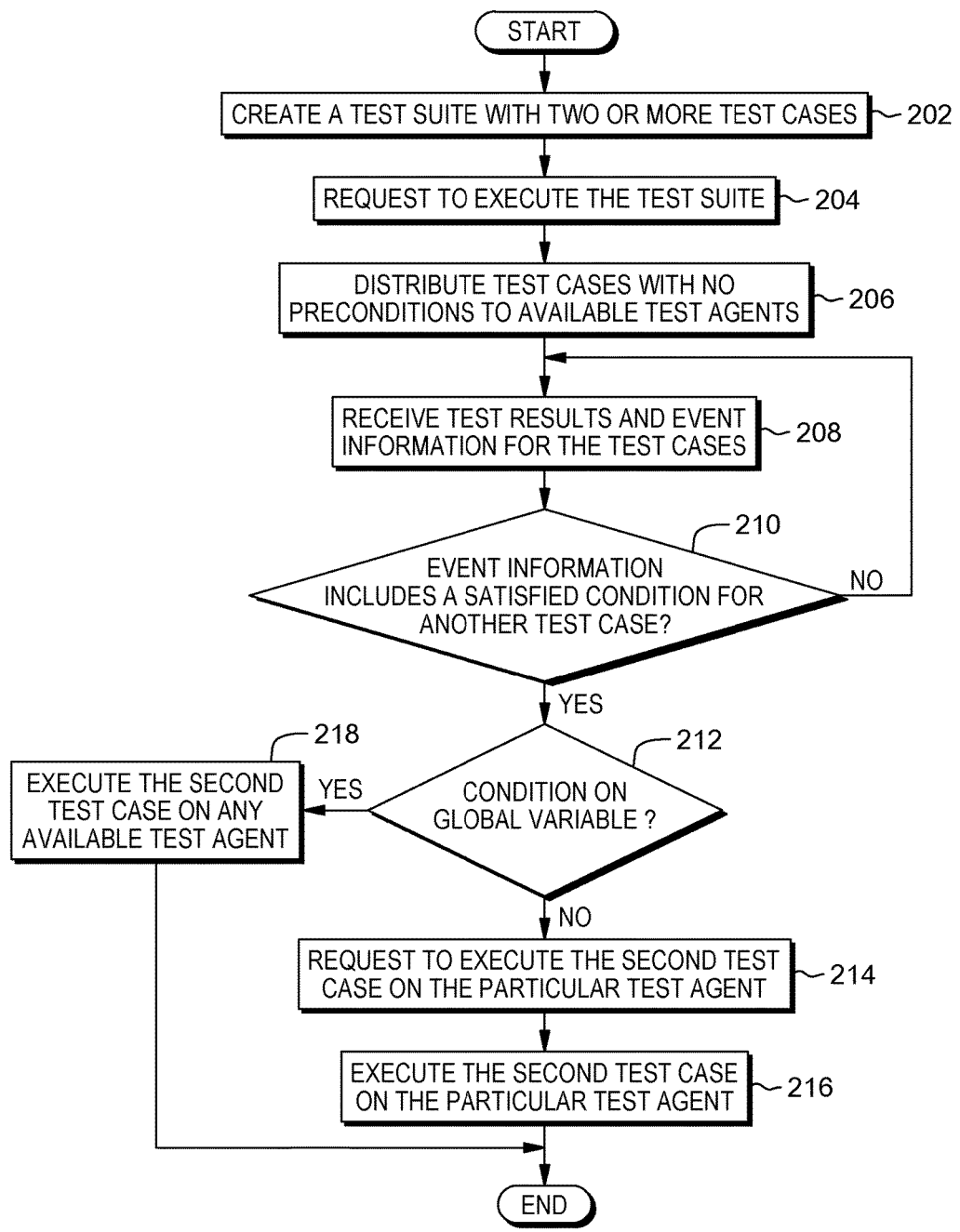
FIG. 2 is a flowchart depicting one embodiment of a test case manager, in accordance with the present invention.

FIG. 2 is a flowchart depicting one embodiment of a test case manager, in accordance with the present invention. As depicted, the method include creating (202) a test suite with two or more test cases, requesting (204) to execute the test suite, distributing (206) test cases with no preconditions to available test agents, receiving (208) test results and event information for the test cases, determining (210) if event information includes a satisfied condition for another test case, determining (212) if the condition is on a global variable, requesting (214) to execute the second test case on the particular test agent, executing (216) the second test case on the particular test agent, and executing (218) the second test case on any available test agent. In one embodiment, the importation method is conducted by test manager 110.

The method may commence by creating (202) a test suite with two or more test cases. In this embodiment, test manager 110 receives a request from a user of client device 104 to create a test suite, wherein the test suite includes multiple test cases intended to test a software program and show a specified set of behaviors. Test manager 110 can include an optional entry for preconditions for each test case, where the user can define dependency for each of the test cases. The defined dependency can include a first attribute, such as a parameter name or a variable name. A second attribute can include a type of variable, for example, a global parameter or global variable signifies that the test case is valid for all test machines (i.e., test machine 106A-106N). In another example, a local parameter or local variable signifies that the test case is valid for a single test machine. A third attribute can include a trigger condition which, for example, executes a test case when a local parameter is equal to, less than, or greater than a predetermined value.

The method may continue by requesting (204) to execute the test suite. In this embodiment, test manager 110 receives a request from a user to execute the test suite on the available test machines 106A-106N. Test manager 110 identifies the request from the user to execute the test suite and identifies the available test machines 106A-106N on which the test suite can execute. Subsequently test manager 110 requests to execute the test suite on test agents 112A-112N on test machines 106A-106N, respectively. In another embodiment, test manager 110 requests to execute the test suite upon reaching a specified implementation time for the test cases. For example, test manager 110 previously received an implementation time of 8 pm on a specified calendar day to execute the test suite.

The method may continue by distributing (206) test cases with no preconditions to available test agents. Test manager 110 can determine which of the test machines 106A-106N are available by requesting each test agent 112A-112N, respectively, to execute a test case with no preconditions. A test case with no preconditions has no dependency on another test case and as a result can execute on any available test machine 106A-106N by test agent 112A-112N, respectively. In one embodiment, test manager 110 determines the number of test cases with no preconditions exceeds the amount of test agents currently available. As a result, test manager 110 queues the test cases with no preconditions and the least amount of test code script, while distributing the test cases with no preconditions and the greatest amount of test code script to available test agents. Alternatively, test manager 110 queues the test cases with no preconditions and the greatest amount of test code script, while distributing the test cases with no preconditions and the least amount of test code script. In another embodiment, test manager 110 idles the test agents with no distributed test cases until test manager 110 determines event information for one of the test cases includes a satisfied condition. In yet another embodiment, test manager 110 executes test cases with the least amount of dependencies for instances where there are still available test agents. Test manager 110 can flag the test cases with the least amount of dependencies, such that test manager 110 can restore the dependency chain subsequent to execution.

The method may continue by receiving (208) test results and event information for the test cases. In this embodiment, as each test agent executes a distributed test case with no preconditions, each of the test agent sends test results and event information for the distributed test case to test manager 110. Test manager 110 receives the test results and event information for each step in the test script of the distributed test case, where the test results correlate to the distributed test case being executed by the test agent. The event information that test manager 110 receives includes variable name, variable type, and a variable value. For every instance that test manager 110 receives event information for a distributed test case, the event information can include alterations to the local parameter or local variable and the global parameter or local parameter.

The method may continue by determining (210) if event information includes a satisfied condition for another test case. In the event the method determines the event information includes a satisfied condition for another test case ("yes" branch, 210), the method may continue by determining if the condition is on a global variable. In the event the method determines the event information does not include a satisfied condition for another test case ("no" branch, 210), the method may continue by receiving (208) test results and event information the test cases. The satisfied condition represents a trigger condition (i.e., third attribute) that was met for one of the test cases with preconditions. For discussion purposes, the test cases with the satisfied condition are referred to as a second test case. The satisfied condition represents a chain of dependency between the test case that produced the test results and event information and the second test case.

The method may continue by determining (212) if the condition is on a global variable. In the event the method determines the condition is not on a global variable ("no" branch, 212), the method may continue by requesting to execute the second test case on the particular test agent. In the event the method determines the condition is on a global variable ("yes" branch, 212), the method may continue by executing (218) the second test case on any available test agent. As previously discussed, a global variable represents a machine independent variable and a local variable represents a machine dependent variable. The global variable signals that any available test machine and test agent combination can execute the second test case and the local variable represents a particular test machine and test agent combination, from which the event information was received, is to execute the second test case.

The method may continue by requesting (214) to execute the second test case on the particular test agent. In this embodiment, the particular test agent represents the test agent from which test manager 110 received test results and event information. Since, the condition is a local variable, test manager is to execute the second test case on the same test agent. Test manager 110 requests to execute the second test case on the particular test agent subsequent to the particular test agent becoming available. Since the particular test case is executing the previous test case, test manager 110 queues the second test case until the particular test agent can execute the second test case. Test manager 110 queues the second test case along with any previously received test cases to be executed on that particular test agent.

The method may continue by executing (216) the second test case on the particular test agent. In this embodiment, test manager 110 executes the second test case on the particular test agent subsequent to the particular test agent becoming available. In another embodiment, test manager 110 executes other test cases in a queue prior to executing the second test case on the particular test agent. Test manager 110 selects test cases to execute on the particular test agent in an order in which test manager 110 chronologically queued the test cases. In the event test manager 110 determines the second test case is next in the queue, test manager 110 executes the second test case on the particular test agent.

The method may continue by executing (218) the second test case on any available test agent. In this embodiment, test manager 110 is not required to execute the second test case on the particular test agent running the test case with the satisfied condition. Since the satisfied condition is for a global variable, test manager 110 executes the second test case on any available test agent sitting idle. In the event there is no available test agent, test manager 110 queues the second test case, along with any other test case awaiting an available test agent. As soon as a test agent become available, test manager 110 executes the test case next in the queue. Alternatively, test manager 110 determines if any of the queued test cases include satisfied local variables and rather than selecting to execute the next test case in the queue, test manager 110 selects the next test case with a local variable associated with that particular test agent.

In a first example scenario, test manager 110 creates a test suite to perform the following operations, (i) create a bank account, (ii) update a customer's mobile number, (iii) issue a check book request, (iv) issue a debit card, (v) deposit a sum of money, and (vi) withdraw a sum of money. For the operations listed above, (i) create a bank account, has to occur prior to the other operations (ii)-(vi) and as a result, has no preconditions. Test manager 110 executes the creation of the bank account, followed by updating a customer's mobile number, issuing a check book request, issuing a debit card, depositing a sum of money, and withdrawing a sum of money for the recently created bank account. An example of a precondition for operations (ii)-(v) can include "AccountCreated/Global/=true". An example of a precondition for operation (vi) can include "MoneyDeposited/Global/=true", where operation (v) occurs prior to operation (vi).

During the creation of the bank account (i.e., operation (i)), test manager 110 receives test results and event information from the test agent executing the creation of the bank account and determines a condition is satisfied for operations (ii)-(v). Test manager 110 identifies the condition for operations (ii)-(v) as being "Global" and as a result, distributes operations (ii)-(v) to any available test agents. During the deposition of the depositing of the sum of money (i.e., operation (v)), test manager 110 receives test results and event information from the test agent executing the depositing of the sum of money and determines a condition is satisfied for operation (vi). Test manager 110 identifies the condition for operation (vi) as being "Global" and as a result, distributes operation (vi) to any available test agent. Rather than perform 6 cycles of executions for the operations, test manager 110 performs 3 cycles of executions for the operations based on the predetermined dependency chain.

In a second example scenario, test manager 110 creates a test suite of a single machine, where the test suite includes test cases directed towards a single system. The test suite can include test cases for cache, memory, and I/O operation state (S1). The test suite is also testing different functionality of an automated vehicle at high speed, where the single system is located on the automated vehicle. Initially, the automated vehicle needs to be traveling at a high speed, so test manager 110 executes the test case controlling the speed of the automated vehicle (i.e., bringing a processor to state (S1), wherein state (S1) is 100 km/h). Subsequent to reaching the high speed (i.e., state (S1)), test manager 110 receives test results and event information from the test agent executing the test case. Test manager 110 identifies that a condition is satisfied (e.g., "S1/Local/=true" or "HighSpeed/Local/=true") and executes any test cases for which the condition is satisfied. In this example, test manager 110 executes test cases for the cache and memory on the same test agent (i.e., the single system) since the satisfied condition is designated as "Local".

Figure 3:
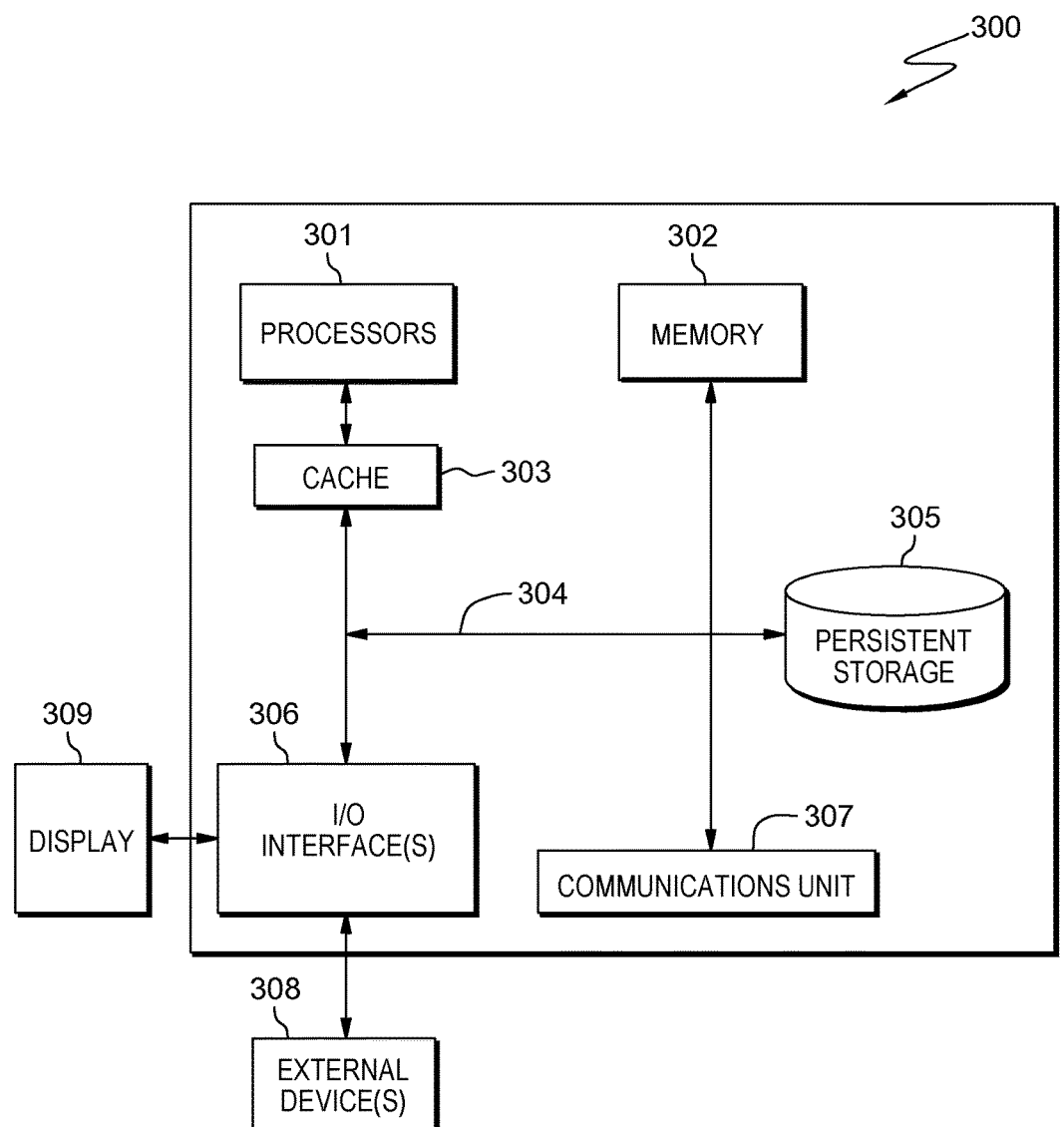
FIG. 3 is a block diagram of components of a computer system, such as the computer server of FIG. 1, in an embodiment in accordance with the present invention.

FIG. 3 depicts computer system 300, where server computer 102 is an example of a system that includes test manager 110. The computer system includes processors 301, cache 303, memory 302, persistent storage 305, communications unit 307, input/output (I/O) interface(s) 306 and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention may be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307.

I/O interface(s) 306 allows for input and output of data with other devices that may be connected to each computer system. For example, I/O interface 306 may provide a connection to external devices 308 such as a keyboard, keypad, a touch screen, and/or some other suitable input device. External devices 308 can also include portable computer readable storage media such as, for example, thumb drives, portable optical or magnetic disks, and memory cards. Software and data used to practice embodiments of the present invention can be stored on such portable computer readable storage media and can be loaded onto persistent storage 305 via I/O interface(s) 306. I/O interface(s) 306 also connect to display 309.

Display 309 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
responsive to reaching a specified execution time for a plurality of test cases, distributing, by one or more processors, the plurality of test cases to any available test agents, wherein each test case out of the plurality of test cases does not have any associated preconditions;
receiving, by one or more processors, event information for a first test case out of the plurality of test cases from a first test agent;
responsive to determining the event information for the first test case includes a satisfied condition for a second test case, determining, by one or more processors, whether the satisfied condition for the second test case relates to a global variable or local variable;
handling, by one or more processors, the second test case, wherein handling the second test case includes distributing the second test case to the first test agent subsequent to the first test agent becoming available if the satisfied condition relates to the local variable and the satisfied condition indicates that the local variable is below, equal, or above a predetermined value, wherein handling the second test case includes distributing the second test case to any idle test agent from the plurality of test agents if the satisfied condition relates to the global variable, and wherein handling the second test case includes queuing the second test case if there are no idle test agents;
responsive to determining that a second test agent has become available, determining, by one or more processors, whether any of the test cases in the queue include satisfied local variables for the second test agent; and
executing, by one or more processors, a third test case with a satisfied local variable for the second test agent.

2. The method of claim 1, further comprising:
creating, by one or more processors, a test suite, wherein the test suite includes a plurality of test cases for execution on a plurality of test agents.

3. The method of claim 1, further comprising:
responsive to determining a number of test cases out of the plurality of test cases with no associated preconditions exceeds a number of test agents currently available, queuing, by one or more processors, a first portion of the test cases out of the plurality of test cases with no associated preconditions and an amount of test code script below or equal to the threshold; and
distributing, by one or more processors, a second portion of the test cases out of the plurality of test cases with no associated preconditions and an amount of test code script above a threshold to any available test agents, wherein the threshold is an amount of test code script for a test case.

4. The method of claim 1, wherein receiving event information for a first test case out of the first portion of test cases includes receiving test results for the first test case.

5. The method of claim 1, wherein the second test case includes associated preconditions, wherein the associated preconditions include a trigger condition.

6. The method of claim 5, wherein the associated preconditions further include a variable name and a variable type.

7. The method of claim 1, further comprising:
receiving, by one or more processors, a request to execute the test suite with the plurality of test cases on the plurality of test agents.

8. A computer program product comprising:
one or more computer readable tangible storage media and program instructions stored on at least one of the one or more storage media, wherein the one or more computer readable tangible storage media are not transitory signals, the program instructions comprising:
program instructions to, responsive to reaching a specified execution time for a plurality of test cases, distribute the plurality of test cases to any available test agents, wherein each test case out of the plurality of test cases does not have any associated preconditions;
program instructions to receive event information for a first test case out of the plurality of test cases from a first test agent;
program instructions to, responsive to determining the event information for the first test case includes a satisfied condition for a second test case, determine whether the satisfied condition for the second test case relates to a global variable or local variable;
program instructions to handle the second test case, wherein handling the second test case includes distributing the second test case to the first test agent subsequent to the first test agent becoming available if the satisfied condition relates to the local variable and the satisfied condition indicates that the local variable is below, equal, or above a predetermined value, wherein handling the second test case includes distributing the second test case to any idle test agent from the plurality of test agents if the satisfied condition relates to the global variable, and wherein handling the second test case includes queuing the second test case if there are no idle test agents;
program instructions to, responsive to determining that a second test agent has become available, determine whether any of the test cases in the queue include satisfied local variables for the second test agent; and
program instructions to execute a third test case with a satisfied local variable for the second test agent.

9. The computer program product of claim 8, wherein the program instructions further comprise:
program instructions to create a test suite, wherein the test suite includes a plurality of test cases for execution on a plurality of test agents.

10. The computer program product of claim 8, wherein the program instructions further comprise:
program instructions to, responsive to determining a number of test cases out of the plurality of test cases with no associated preconditions exceeds a number of test agents currently available, queue a first portion of the test cases out of the plurality of test cases with no associated preconditions and an amount of test code script below or equal to the threshold; and
program instruction to distribute a second portion of the test cases out of the plurality of test cases with no associated preconditions and an amount of test code script above a threshold to any available test agents, wherein the threshold is an amount of test code script for a test case.

11. The computer program product of claim 8, wherein program instructions to receive event information for a first test case out of the first portion of test cases includes program institutions to receive test results for the first test case.

12. The computer program product of claim 8, wherein the second test case includes associated preconditions, wherein the associated preconditions include a trigger condition.

13. The computer program product of claim 12, wherein the associated preconditions further include a variable name and a variable type.

14. The computer program product of claim 8, wherein the program instructions further comprise:
program instructions to receive a request to execute the test suite with the plurality of test cases on the plurality of test agents.

15. A computer system comprising:
one or more computer processors;
one or more computer readable tangible storage media, wherein the one or more computer readable tangible storage media are not transitory signals; and
program instructions stored on the one or more computer readable tangible storage media for execution by at least one of the one or more computer processors, the program instructions comprising:
program instructions to, responsive to reaching a specified execution time for a plurality of test cases, distribute the plurality of test cases to any available test agents, wherein each test case out of the plurality of test cases does not have any associated preconditions;
program instructions to receive event information for a first test case out of the plurality of test cases from a first test agent;
program instructions to, responsive to determining the event information for the first test case includes a satisfied condition for a second test case, determine whether the satisfied condition for the second test case relates to a global variable or local variable;
program instructions to handle the second test case, wherein handling the second test case includes distributing the second test case to the first test agent subsequent to the first test agent becoming available if the satisfied condition relates to the local variable and the satisfied condition indicates that the local variable is below, equal, or above a predetermined value, wherein handling the second test case includes distributing the second test case to any idle test agent from the plurality of test agents if the satisfied condition relates to the global variable, and wherein handling the second test case includes queuing the second test case if there are no idle test agents;
program instructions to, responsive to determining that a second test agent has become available, determine whether any of the test cases in the queue include satisfied local variables for the second test agent; and
program instructions to execute a third test case with a satisfied local variable for the second test agent.

16. The computer system of claim 15, wherein the program instructions further comprise:
program instructions to create a test suite, wherein the test suite includes a plurality of test cases for execution on a plurality of test agents.

17. The computer system of claim 15, wherein the program instructions further comprise:
program instructions to, responsive to determining a number of test cases out of the plurality of test cases with no associated preconditions exceeds a number of test agents currently available, queue a first portion of the test cases out of the plurality of test cases with no associated preconditions and an amount of test code script below or equal to the threshold; and program instruction to distribute a second portion of the test cases out of the plurality of test cases with no associated preconditions and an amount of test code script above a threshold to any available test agents, wherein the threshold is an amount of test code script for a test case.

18. The computer system of claim 15, wherein program instructions to receive event information for a first test case out of the first portion of test cases includes program institutions to receive test results for the first test case.

19. The computer system of claim 15, wherein the second test case includes associated preconditions, wherein the associated preconditions include a trigger condition.

20. The computer system of claim 19, wherein the associated preconditions further include a variable name and a variable type.

* * * * *